(12) United States Patent
Vroom et al.

(10) Patent No.: US 9,285,831 B2
(45) Date of Patent: Mar. 15, 2016

(54) DOCKING STATION FOR PORTABLE ELECTRONICS

(71) Applicant: Henge Docks LLC, Arlington, VA (US)

(72) Inventors: Matthew Leigh Vroom, San Francisco, CA (US); Benjamin Edwards Maskell, Arlington, VA (US)

(73) Assignee: Henge Docks LLC, Arlington, VA (US)

( * ) Notice: Subject to any disclaimer, the term of this patent is extended or adjusted under 35 U.S.C. 154(b) by 0 days.

(21) Appl. No.: 14/292,861

(22) Filed: May 31, 2014

(65) Prior Publication Data

US 2014/0268543 A1    Sep. 18, 2014

Related U.S. Application Data

(63) Continuation-in-part of application No. 13/633,089, filed on Oct. 1, 2012, now Pat. No. 8,821,193, which is a continuation-in-part of application No. 13/306,960, filed on Nov. 29, 2011, now Pat. No. 8,512,079, which is a continuation of application No. 13/306,956, filed on Nov. 29, 2011, now Pat. No. 8,419,479, which is a continuation-in-part of application No. 12/562,121, filed on Sep. 17, 2009, now Pat. No. 8,105,108.

(51) Int. Cl.
| | |
|---|---|
| *G06F 1/16* | (2006.01) |
| *H01R 13/518* | (2006.01) |
| *H01R 13/73* | (2006.01) |
| *H01R 27/02* | (2006.01) |

(52) U.S. Cl.
CPC ............ *G06F 1/1632* (2013.01); *H01R 13/518* (2013.01); *H01R 13/73* (2013.01); *H01R 27/02* (2013.01); *G06F 2200/1639* (2013.01); *H01R 2201/06* (2013.01)

(58) Field of Classification Search
CPC ..... G06F 1/1632; H01R 13/518; H01R 13/73; H01R 27/02; H01R 13/62; H01R 13/629
USPC ........................................ 361/679.41–679.45
See application file for complete search history.

(56) References Cited

U.S. PATENT DOCUMENTS

| | | | |
|---|---|---|---|
| 253,129 | A | 11/1950 | Olson |
| 290,366 | A | 9/1959 | Cornell, Jr. |
| 3,727,171 | A | 4/1973 | Coles et al. |
| 3,775,733 | A | 11/1973 | Ege |
| 3,781,766 | A | 12/1973 | Teagno et al. |
| 3,816,821 | A | 6/1974 | Rhodes |
| 3,873,172 | A | 3/1975 | Paullus |
| 4,097,113 | A | 6/1978 | McKelvy |
| 4,178,060 | A | 12/1979 | Coffey |
| 4,387,951 | A | 6/1983 | Hall et al. |
| 4,418,975 | A | 12/1983 | O'Keefe, II |
| 4,490,002 | A | 12/1984 | Fowler |
| 4,659,166 | A | 4/1987 | Morningstar et al. |
| 4,726,789 | A | 2/1988 | Yaffe |
| 4,762,388 | A | 8/1988 | Tanaka et al. |

(Continued)

*Primary Examiner* — Ross Gushi
(74) *Attorney, Agent, or Firm* — Benjamin E. Maskell

(57) ABSTRACT

Disclosed is a docking station for holding a plurality of external connectors in position to interface with an electronic device including a main body having a first side and a second side, a positioning member extending vertically from the first side of the main body for receiving the electronic device, a stabilizing member extending horizontally on the second side, a first through-hole extending from the first side to the second side, and a fastening mechanism for securing an external connector in the through-hole.

21 Claims, 8 Drawing Sheets

(56) References Cited

U.S. PATENT DOCUMENTS

| | | | |
|---|---|---|---|
| 4,836,804 A | 6/1989 | London et al. |
| 4,842,363 A | 6/1989 | Margolin et al. |
| 4,870,702 A | 9/1989 | Azzouni |
| 4,881,910 A | 11/1989 | Odemer |
| 5,030,128 A | 7/1991 | Herron et al. |
| 5,092,788 A | 3/1992 | Pristupa, Jr. et al. |
| 5,137,455 A | 8/1992 | Moerbe et al. |
| 5,186,646 A | 2/1993 | Pederson |
| 5,411,416 A | 5/1995 | Balon et al. |
| 5,460,547 A | 10/1995 | Belt et al. |
| 5,569,052 A | 10/1996 | Belt et al. |
| 5,679,026 A | 10/1997 | Fain et al. |
| 5,683,261 A | 11/1997 | Ahles et al. |
| 5,725,397 A | 3/1998 | Fukamachi et al. |
| 5,729,478 A | 3/1998 | Ma et al. |
| 5,738,537 A | 4/1998 | Setoguchi et al. |
| 5,805,412 A | 9/1998 | Yanagisawa et al. |
| 6,045,410 A | 4/2000 | Norizuki et al. |
| 6,046,571 A | 4/2000 | Bovio et al. |
| 6,061,233 A | 5/2000 | Jung |
| 6,151,218 A | 11/2000 | Pirdy et al. |
| 6,206,578 B1 | 3/2001 | Shin et al. |
| 6,309,230 B2 | 10/2001 | Helot |
| 6,312,295 B2 | 11/2001 | Nishimatsu |
| 6,321,340 B1 | 11/2001 | Shin et al. |
| 6,343,957 B1 | 2/2002 | Kuo et al. |
| 6,352,447 B1 | 3/2002 | Ruth |
| 6,411,503 B1 | 6/2002 | Kambayashi et al. |
| 6,424,524 B2 | 7/2002 | Bovio et al. |
| 6,524,140 B2 | 2/2003 | Takagi et al. |
| 6,558,201 B1 | 5/2003 | Begley et al. |
| 6,663,439 B2 | 12/2003 | Henry et al. |
| 6,666,715 B2 | 12/2003 | Fujita et al. |
| 6,697,892 B1 | 2/2004 | Laity et al. |
| 6,724,615 B2 | 4/2004 | Kambayashi et al. |
| 6,767,253 B1 | 7/2004 | Werner et al. |
| 6,796,844 B1 | 9/2004 | Edwards, III |
| 6,814,626 B2 | 11/2004 | Wen-Yao |
| 6,878,016 B2 | 4/2005 | Wulff et al. |
| 6,934,788 B2 | 8/2005 | Laity et al. |
| 6,943,527 B2 | 9/2005 | Liu et al. |
| 7,077,709 B1 | 7/2006 | Shin-Ting |
| 7,081,025 B2 | 7/2006 | Zhang et al. |
| 7,094,112 B2 | 8/2006 | Arai et al. |
| 7,144,278 B2 | 12/2006 | Le Gallic et al. |
| 7,247,032 B2 | 7/2007 | Merz |
| 7,320,614 B2 | 1/2008 | Toda et al. |
| 7,417,855 B2 | 8/2008 | Carnevali |
| 7,503,808 B1 | 3/2009 | O'Shea |
| 7,508,661 B2 | 3/2009 | Carnevali |
| 7,554,819 B2 | 6/2009 | Chen et al. |
| 7,563,140 B1 | 7/2009 | Wan et al. |
| 7,601,024 B2 | 10/2009 | Martich |
| 7,690,944 B2 | 4/2010 | Matsumura et al. |
| 7,708,240 B2 * | 5/2010 | Homer et al. | 248/130 |
| 7,857,664 B2 | 12/2010 | Waryck et al. |
| 7,914,348 B1 | 3/2011 | Lin |
| 7,942,705 B2 | 5/2011 | Murphy et al. |
| 8,079,880 B2 | 12/2011 | Lin et al. |
| 8,105,108 B2 | 1/2012 | Vroom et al. |
| 8,212,145 B2 | 7/2012 | Nagai et al. |
| 8,272,903 B2 | 9/2012 | Lin |
| 8,353,730 B1 | 1/2013 | Wang et al. |
| 8,419,479 B2 | 4/2013 | Vroom et al. |
| 8,512,079 B2 | 8/2013 | Vroom et al. |
| 8,512,080 B2 | 8/2013 | Vroom et al. |
| 8,568,160 B2 | 10/2013 | Coggins et al. |
| 8,585,443 B1 | 11/2013 | Vroom et al. |
| 2001/0012718 A1 | 8/2001 | Nishimatsu |
| 2001/0012734 A1 | 8/2001 | Nishimatsu |
| 2002/0037669 A1 | 3/2002 | D'Addario |
| 2002/0123271 A1 | 9/2002 | Henry et al. |
| 2003/0095395 A1 | 5/2003 | Clark et al. |
| 2003/0220001 A1 | 11/2003 | Milan |
| 2004/0053538 A1 | 3/2004 | Villain |
| 2004/0077225 A1 | 4/2004 | Chun-Fu |
| 2004/0115994 A1 | 6/2004 | Wulff et al. |
| 2005/0026510 A1 | 2/2005 | Orihara |
| 2005/0064765 A1 | 3/2005 | Simpson et al. |
| 2005/0070170 A1 | 3/2005 | Zhang et al. |
| 2005/0112940 A1 | 5/2005 | Naganishi |
| 2005/0168937 A1 | 8/2005 | Yin et al. |
| 2005/0266720 A1 | 12/2005 | Lin |
| 2005/0286219 A1 | 12/2005 | Kim |
| 2006/0061964 A1 | 3/2006 | Cheng |
| 2006/0079136 A1 | 4/2006 | Wei |
| 2006/0085584 A1 | 4/2006 | Chen et al. |
| 2006/0139875 A1 | 6/2006 | Cheng et al. |
| 2006/0148328 A1 | 7/2006 | Le Gallic |
| 2006/0171112 A1 | 8/2006 | Lev et al. |
| 2006/0250767 A1 | 11/2006 | Brophy et al. |
| 2007/0070598 A1 | 3/2007 | Chuang |
| 2007/0224889 A1 | 9/2007 | Ito |
| 2007/0232152 A1 | 10/2007 | Hong |
| 2009/0016015 A1 | 1/2009 | Seibert et al. |
| 2009/0023347 A1 | 1/2009 | Hou et al. |
| 2010/0073862 A1 | 3/2010 | Carnevali |
| 2010/0158297 A1 | 6/2010 | Stuczynski |
| 2010/0195279 A1 | 8/2010 | Michael |
| 2010/0197173 A1 | 8/2010 | Tsunoda et al. |
| 2010/0265652 A1 | 10/2010 | Agata et al. |
| 2011/0065314 A1 | 3/2011 | Vroom et al. |
| 2011/0103003 A1 | 5/2011 | Ward et al. |
| 2011/0134601 A1 | 6/2011 | Sa |
| 2011/0242754 A1 | 10/2011 | Morton |
| 2011/0279966 A1 | 11/2011 | Sayavong |
| 2011/0318944 A1 | 12/2011 | Lin et al. |
| 2012/0127651 A1 | 5/2012 | Kwon et al. |
| 2012/0162902 A1 | 6/2012 | Zhou et al. |
| 2012/0212900 A1 | 8/2012 | Hung |
| 2013/0137297 A1 | 5/2013 | Vroom |
| 2013/0148289 A1 | 6/2013 | Kwon |
| 2014/0038450 A1 | 2/2014 | Vroom et al. |
| 2014/0094058 A1 | 4/2014 | Vroom |

* cited by examiner

DOCKING STATION FOR PORTABLE ELECTRONICS

BACKGROUND OF THE INVENTION

This application is a continuation-in-part of pending U.S. application Ser. No. 13/633,089 filed on Oct. 1, 2012 which is a continuation-in-part of U.S. application Ser. No. 13/306,960 filed Nov. 29, 2011, now U.S. Pat. No. 8,512,079 which is a continuation of U.S. application Ser. No. 13/306,956 filed Nov. 29, 2011, now U.S. Pat. No. 8,419,479 which is a continuation-in-part of U.S. application Ser. No. 12/562,121 filed Sep. 17, 2009, now U.S. Pat. No. 8,105,108. All of the aforementioned applications are hereby incorporated by reference.

FIELD OF THE INVENTION

The embodiments of the invention relate to a docking station, and more particularly, to a docking station for portable electronic device such as a laptop computer. Although embodiments of the invention are suitable for a wide scope of applications, it is particularly suitable for facilitating the rapid connection of external connectors to a portable electronic device.

DISCUSSION OF THE RELATED ART

A docking station for electronic devices refers to a peripheral which facilitates the connection of external connectors to a portable device. Such docking stations can contain electronic connectors integrated into the body of the docking station that mate with the corresponding ports on an electronic device. Ports on the main body of the docking station can replicate the ports on the electronic device. The user can then attach external connectors, such as an USB connector from a printer, to the replicated ports on the docking station. Such docking stations can simplify the connection of peripheral devices by removing the need to individually connect and disconnect the cables to the electronic device.

Despite the efficiencies of the related art docking stations, the unnecessary duplication of ports increases the materials costs and manufacturing labor costs. Additionally, certain proprietary ports, by virtue of manufacturer's patent rights, cannot be duplicated without a license. Through extended use, individual ports and connectors can become worn and dysfunctional. When a single component of the docking station is broken, the entire dock must be replaced. Finally, duplication of ports contributes to the deterioration of signal integrity.

Related art docking stations are typically designed such that the corresponding electronic device can be used in a horizontal orientation. However, a horizontal orientation consumes a large portion of limited desk space and can contribute to work place clutter. Some related art docking stations require non-standard tools for setup such as allen wrenches. These tools can be difficult to locate or become lost thus contributing to user frustration when setting up the related art docking stations. Fasteners on the related art docking stations can become worn or detract from the aesthetic appearance of the docking station. Cables connected to the related art docking stations can become tangled and disorganized thereby contributing to workplace clutter.

SUMMARY OF THE INVENTION

Accordingly, embodiments of the invention are directed to a docking station for portable electronics obviates one or more of the problems due to limitations and disadvantages of the related art.

An object of embodiments of the invention is to provide a docking station having connectors and ports that are removable and replaceable.

Another object of embodiments of the invention is to provide a docking station with integral cable fasteners for retaining external connectors.

Yet another object of embodiments of the invention is to provide a docking station that efficiently utilizes desktop space.

Still another object of embodiments of the invention is to provide mechanisms for retaining small essential parts and tools.

Still another object of embodiments of the invention is to provide structures for organizing cables and connectors attached to the docking station.

Still another object of embodiments of the invention is to provide protection for cable fasteners and the electronic device.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a docking station for holding a plurality of external connectors in position to interface with an electronic device includes a main body having a first side and a second side, a positioning member extending vertically from the first side of the main body for receiving the electronic device, a stabilizing member extending horizontally on the second side, a first through-hole extending from the first side to the second side, and a fastening mechanism for securing an external connector in the through-hole.

In yet another aspect, a docking station for connecting a plurality of external connectors to an electronic device includes a main body, an interface surface on the main body, a first plug on the interface surface, a positioning member extending vertically from the interface surface for receiving the electronic device, a bottom side of the main body; and a stabilizing member forming a base on the bottom side.

In still another aspect, a docking station for holding a plurality of external connectors in position to interface with an electronic device includes a main body having a top side and a bottom side opposite the top side, a positioning member extending vertically from the top side of the main body for receiving the electronic device, a stabilizing member on the bottom side, a first through-hole extending from the top side to the bottom side, a fastening mechanism for securing an external connector in the through-hole; a plate at least partially covering the fastening mechanism.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Figure 1:
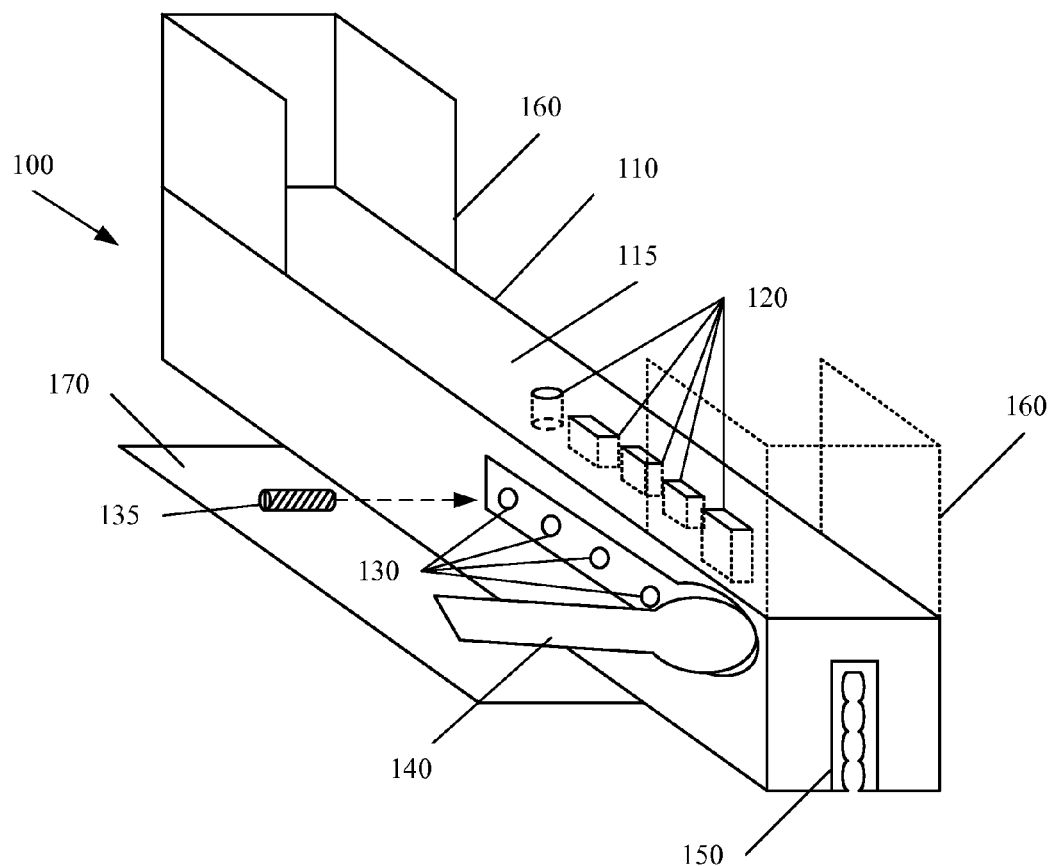
FIG. 1 is an isometric view of a docking station for an electronic device according to an exemplary embodiment of the invention.

Reference will now be made in detail to the preferred embodiments of the invention, examples of which are illustrated in the accompanying drawings. The invention can, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

FIG. 1 is an isometric view of a docking station for an electronic device according to an exemplary embodiment of the invention. As shown in FIG. 1, a docking station for an electronic device (docking station) 100 includes a main body 110, a plurality of voids 120, a plurality of fastener holes 130 each sized to receive a fastener 135, a fastener cover 140, a cable organizer 150, a positioning member 160, and a bottom stabilizer 170.

The voids 120 can be positioned in the main body 110 such that they align with the corresponding ports on a specific electronic device (not shown for clarity.) The voids 120 can be sized to match the size of a specific external connector such as a USB connector, Ethernet connector, or other common connector. The voids 120 can extend from an interface surface 115 to an inside or bottom surface of the docking station 100. Each of the voids 120 can be perpendicularly intersected by fastener holes 130 for receiving a fastener 135. An external connector (not shown) such as a USB cable can be inserted into a properly sized void 120 and retained therein by tightening the fastener 135 in one of the fastener holes 130. The fastener hole 130 can receive a fastener 135 and, collectively, can form an integral fastener.

The main body 110 can include a fastener cover 140 that can protect and conceal the fastener holes 130 and fasteners 135. The cover 140 can be removed to access the access the fastener holes 130 and fasteners 135. The cover 140 can be attached to the main body 110 by a joint or other mechanism. The fastener cover 140 can cover one or more of the fastener holes 130 and or fasteners 135. In preferred embodiments of the invention the fastener cover 140 can be formed from rubber and be sized to fit into a recessed portion surrounding the fastener holes 130. The fastener cover 140 can be made of metal, plastic, wood, or other suitable material.

The main body 110 can include a cable organizer 150. The cable organizer 150 can retain and organize the cables associated with connectors that are inserted into voids 120. The cable organizer 150 can retain cables as they leave the main body 110 and prevent cables from falling out of the main body 110 if the docking station 100 is picked up. The cable organizer 150 can be arranged horizontally or vertically to best accommodate the cables of the abovementioned external connectors. The cable organizer 150 can be formed from opposing ridged surfaces each including a plurality of ridges. The opposing ridged surfaces can be separated by a gap, preferably in the range of ¼" to ½". The gap separating the ridged surfaces of the cable organizer 150 can be sized to be slightly smaller than the anticipated diameter of the cables of the external connectors. In that way, the sheathing of the cables of the external connectors can be compressed slightly to allow the cables to pass through the opposing ridges and be retained in the valleys between ridges. If a user were to lift the docking station, the cables would be unlikely to fall out of the bottom, and unlikely to become trapped underneath the stabilizing member 170 or the main body 110.

The main body 110 can include positioning member 160 on one or both sides of the docking station 100 for aiding in the insertion, alignment, and stability of an electronic device (not shown for clarity) inserted into the docking station 100. The positioning member 160 can position the electronic device to interface with the docking station 100. The positioning member 160 can extend vertically upwards from the interface surface 115. The positioning member can be formed from a plurality of vertical side walls, each sidewall positioned to contact a surface of a specific electronic device thereby stabilizing the electronic device within the docking station 100.

The docking station 100 can include a bottom stabilizer 170 that extends in a horizontal from either or both sides of the main body 110. The bottom stabilizer 170 can stabilize the dock from tipping or falling in response to an accidental horizontal force. The bottom stabilizer 170 can assist with the insertion or removal of the electronic device by providing a wide surface for a user's hand to hold the dock 100 while removing an electronic device.

External connectors can be electrical connector that attach to ports on the electronic device. External connectors can be, for example, USB, VGA, ⅛" audio, power, HDMI, DVI, Display Port, Mini Display Port, serial or Firewire connectors. External connectors proprietary to Apple are also contemplated including the MagSafe connector. While specific types of external connectors have been named, other types of external connectors can also be used with the present invention. The voids 120 can be formed in various sizes and shapes to best accommodate the external connectors contemplated. The voids 120 can be sized to retain specific external connectors.

Figure 2:
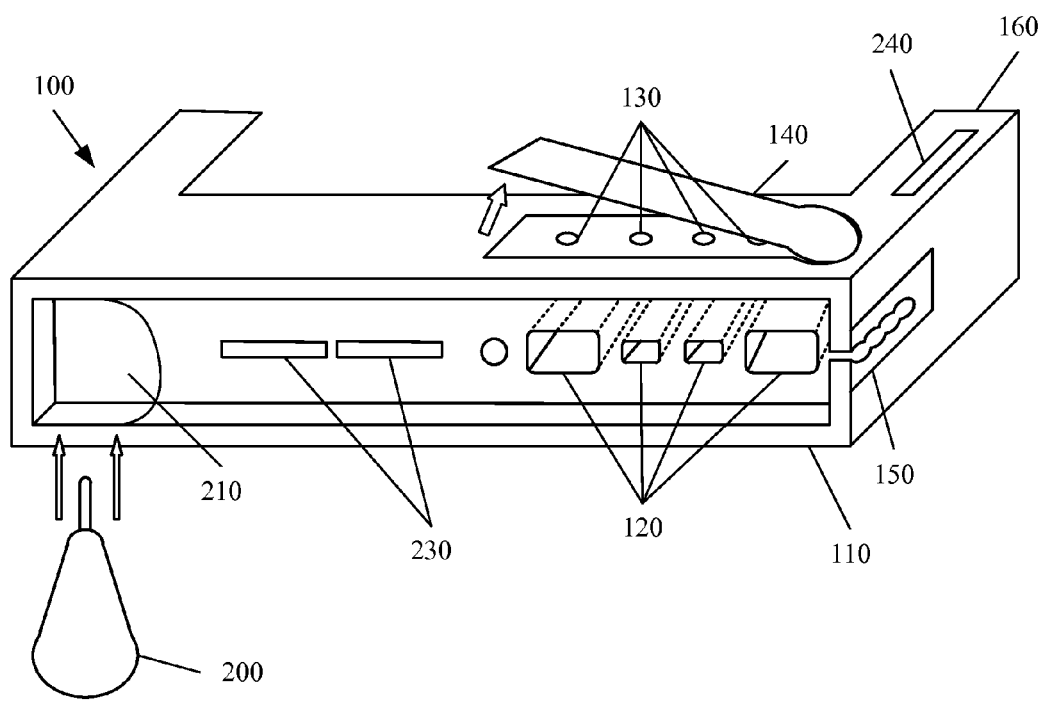
FIG. 2 is a schematic drawing showing a bottom portion of a docking station according to an exemplary embodiment of the invention.

FIG. 2 is a schematic drawing showing a bottom portion of a docking station according to an exemplary embodiment of the invention. As shown in FIG. 2, a docking station includes 100 includes a main body 110, a plurality of voids 120, a plurality of fastener holes 130, a fastener cover 140, a cable organizer 150, a positioning member 160, a vents 230 and 240, a tool 200 and a slot 210 for storing and retaining the tool. The voids 120 can be positioned in the main body 110 such that they align with the corresponding ports on an electrical device (not shown for clarity). Each void 120 can have a fastener hole 130 for receiving a screw or other fastener.

The bottom of the main body 110 can include a slot or recess 210 for storing and retaining tool 200. The slot or recess 210 can be sized to match the relative dimensions of the tool 200. A tool 200 can be used to tighten and loosen the fasteners in fastener holes 130.

The slot 210 for the fastening tool 200 can be placed anywhere on the bottom of the docking station 100. The slot 210 can be positioned such that it does not interfere with the voids 120 and the cables to be inserted therein. The tool 200 can be retained in the slot 210 or main body 110. The slot 210 can protect the tool 200 and can prevent loss of the tool 200. The tool 200 can be a hex key, screwdriver, allen wrench, or other suitable fastening tool.

The bottom of the main body 110 can include a main body vent 230. The main body vent 230 can allow heat generated by the electronic device to escape the main body 110. The main body vent 230 can allow cool air to pass from the underside of the docking station (shown) to the top side of the docking station. The main body vent 230 can be a single through-hole or a series of through holes.

The positioning member 160 can include a stabilizer vent 240. The stabilizer vent 240 can allow heat generated by the electronic device to escape the positioning member 160. The stabilizer vent 240 can be vertically oriented on a left, rear portion (shown) of the positioning member 160. The stabilizer vent 240 can be a single through-hole or a series of through holes.

Figure 3:
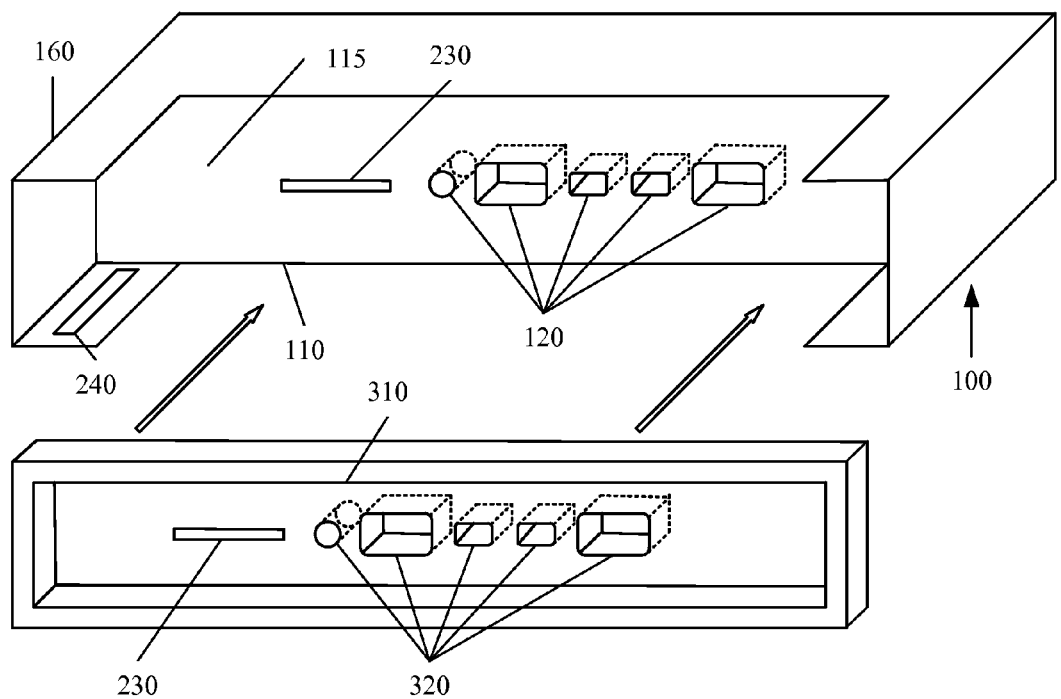
FIG. 3 is an isometric view of a tray liner for a docking station according to an exemplary embodiment of the invention.

FIG. 3 is an isometric view of a tray liner for a docking station according to an exemplary embodiment of the invention. As shown in FIG. 3, a docking station 100 includes a main body 110, the interface surface 115, a plurality of voids 120, a positioning member 160, a main body vent 230, a stabilizer vent 240, a liner 310, and voids in the liner 320.

The liner voids 320 can be positioned in the liner 310 such that they align with voids 120, a main body vent 230, or a stabilizer vent 240. The concave surface created by the interface surface 115, and the inside of the top stabilizer can be lined with a liner 310.

The liner 310 can be made from a different material than the main body 110 such that the material of the main body 110 is harder than that of the liner 310. The liner 310 cover an inside surface of the positioning member 160.

The liner 130 can be formed from rubber, plastic, wood, metal, or organic material. When choosing a liner it is preferred that the soft enough to prevent cosmetic damage to the electronic device (not shown for clarity), but hard enough that it does not bind with the electronic device as it interacts with the electronic device.

The liner 310 can be a shell that fits inside the positioning member 160 without interfering with the functionality of the docking station 100. The liner 310 can be made to cover the inside of the positioning member 160 without interfering with the functionality of the docking station 100. In addition, the liner 310 can be co-molded, injection molded or be inserted into the docking station and secured with snaps that engage indents in the top stabilizer 160. The liner can be removable such that electronic devices having aftermarket cases can be used with the present invention.

Figure 4:
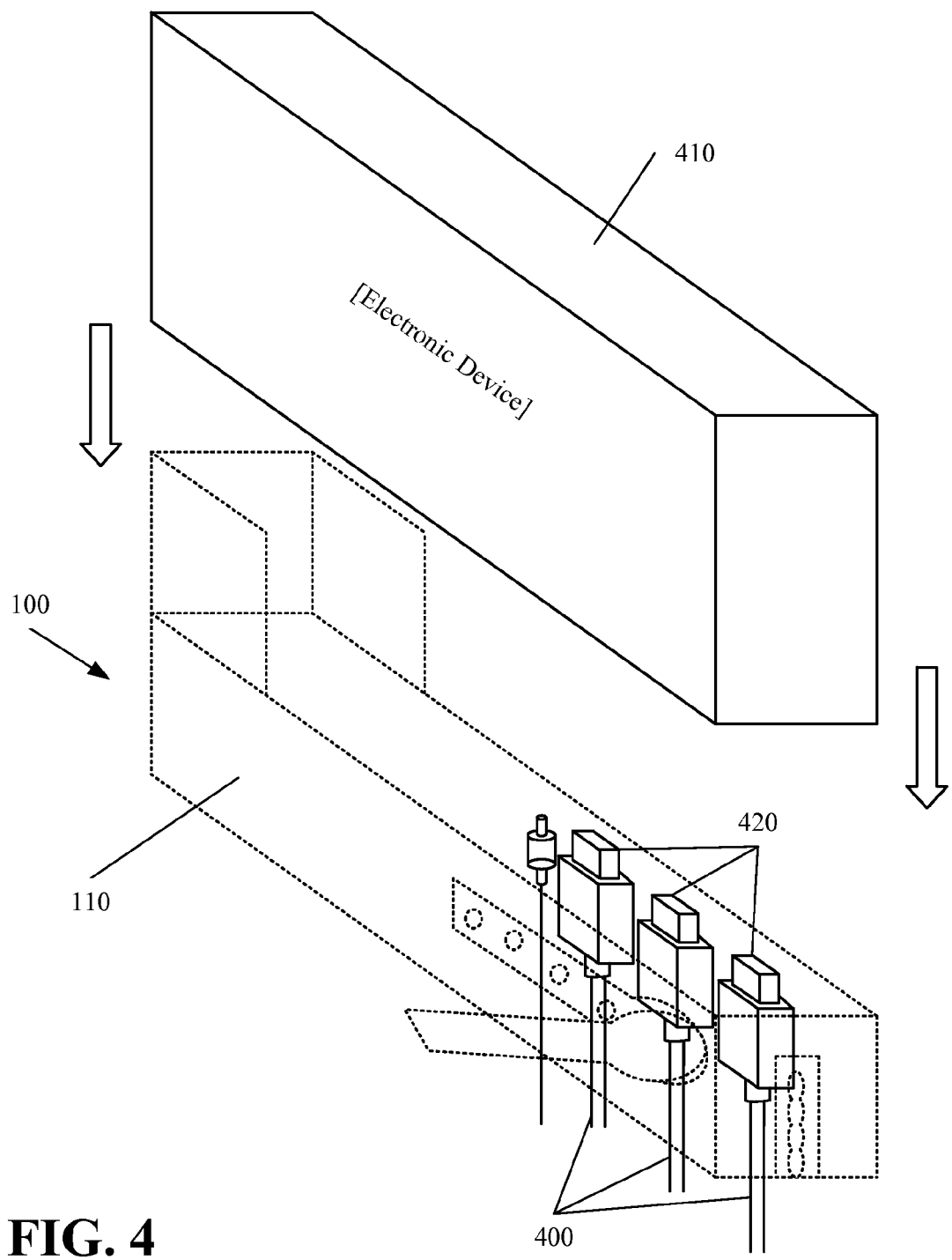
FIG. 4 is an isometric view of a docking station for an electronic device according to an exemplary embodiment of the invention.

FIG. 4 is an isometric view of a docking station for an electronic device according to an exemplary embodiment of the invention. As shown in FIG. 4, a docking station 100 can receive external connectors 400. The docking station 100 can receive an electronic device 410. The depth which external connectors 400 are inserted into the docking station 100 can be determined by the user. In practice, the depth chosen by the user will be sufficient to allow the electrical contacts 420 of the external connectors 400 to protrude from the main body 110 and engage the corresponding ports of the electronic device 410.

One method for the user to determine the optimal insertion depth for the external connectors 400 is to insert the electronic device 410 into the docking station 100 before inserting the external connectors 400. After the electronic device 410 is inserted, the user can insert the external connectors 400. Optimal insertion depth of the external connectors 400 is achieved when the external connectors 400 are fully engaged with the ports on the electronic device 410. The external connectors can now be secured to the docking station 100 with a fastener (not shown for clarity.) When the electronic device 410 is removed, the external connectors 400 are held in place by the fasteners and are optimally positioned for subsequent reinsertion of the electronic device 410.

The electronic device 410 can be an Aluminum Unibody Macbook Pro. While an Aluminum Unibody Macbook Pro is contemplated, the present invention is equally applicable to other electronic devices including laptops, cell phones, tablets, and PDAs.

Figure 5A:
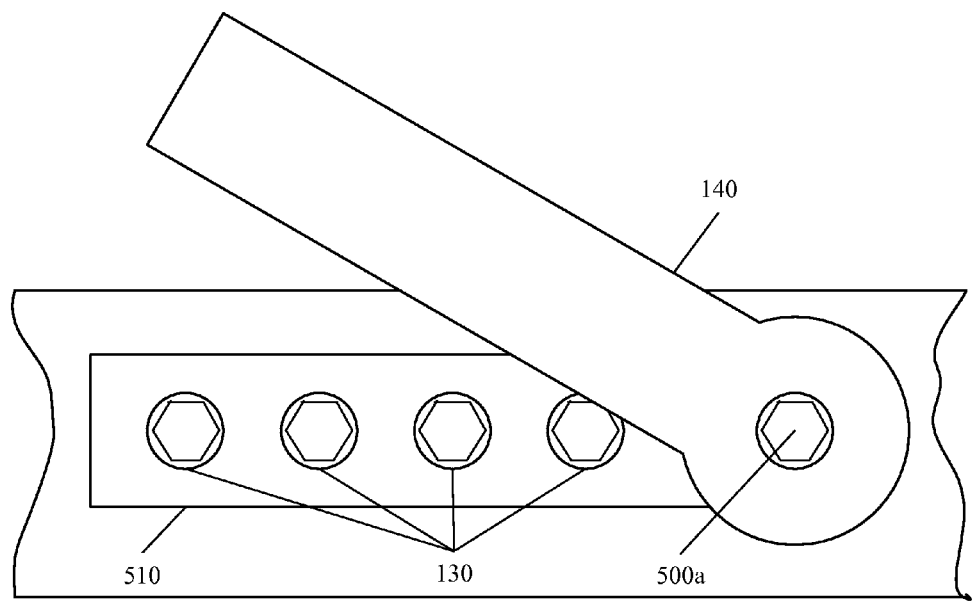
FIG. 5A is schematic drawing showing a side-view of a fastener cover assembly according to an exemplary embodiment of the invention.

FIG. 5A is schematic drawing showing a side-view of a fastener cover assembly according to an exemplary embodiment of the invention. As shown in FIG. 5A, the fastener cover assembly can include a plurality of integral fasteners 130, a fastener cover 140, a cover retainer 500a and a recess 510.

The fastener cover 140 can be secured by a cover retainer 500a. The fastener cover can protect and conceal one or more of the integral fasteners 130. The recess 510 can be shaped to receive the fastener cover 140 so that the fastener cover is flush with the main body when attached.

The fastener cover 140 can protect the integral fasteners 130, keep the integral fasteners 130 clean, and prevent the integral fasteners 130 from falling out. The fastener cover 140 can be formed from rubber, plastic, wood, metal, or ceramic. The fastener cover 140 can be formed from a material that is softer than the main body of the docking station so that installation and removal of the fastener cover 140 does not scratch the docking station. The fastener cover 140 can be formed from a material that will bind to the recess 510 by sticking to it or providing a suction seal.

The fastener 500a can be a screw, peg, pin, or other retention mechanism that holds the fastener cover 140 in place when covering the integral fasteners 130, and then loosens to allow the fastener cover 140 to rotate around the fastener 500 allowing partial or full access to the integral fasteners.

Figure 5B:
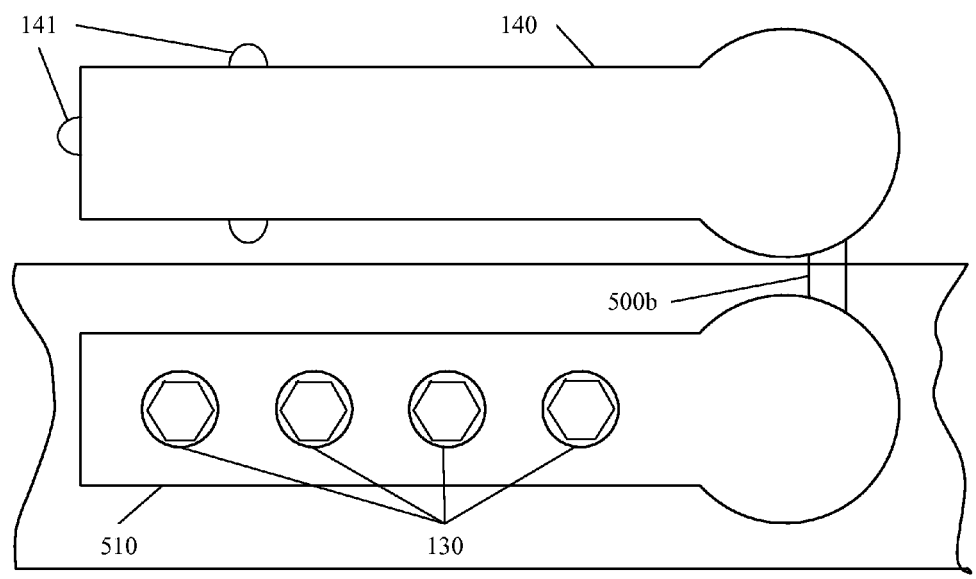
FIG. 5B is a schematic drawing showing a side-view of a fastener cover assembly according to an exemplary embodiment of the invention.

FIG. 5B is a schematic drawing illustrating a side-view of a fastener cover assembly connected to the docking station in another manner. As shown in FIG. 5B, the fastener cover assembly can include a plurality of integral fasteners 130, a fastener cover 140, a cover retainer 500b, retention tabs 141, and a recess 510.

The fastener cover 140 can be secured by a cover retainer 500b. The fastener cover can be secured to the main body by retention tabs 141. The fastener cover 140 can protect and conceal one or more of the integral fasteners 130. The recess 510 can be shaped to receive the fastener cover 140 so that the fastener cover is flush with the main body when attached.

The fastener cover 140 can protect the integral fasteners 130, keep the integral fasteners 130 clean, and prevent the integral fasteners 130 from falling out. The fastener cover 140 can be formed from rubber, plastic, wood, metal, or ceramic. The fastener cover 140 can be formed from a material that is softer than the main body of the docking station so that installation and removal of the fastener cover 140 does not scratch the docking station. The material of the fastener cover 140 can be of material that it will bind to the recess 510 by sticking to it or providing a suction seal.

The fastener 500b can be a string, cord, spring, or other retention mechanism that holds the fastener cover 140 attached to the recess 510 or main body 110. The fastener cover 140 can engage the recess 510 to keep the fastener cover 140 connected to the recess 510. The recess 510 can further include depressions or slots (not shown) to receive retention tabs 141. For example, the fastener cover 510 may be connected to the main body 110 or the recess 510 by retention tabs 141 that engage an indent (not shown) in the main body 110.

Figure 6A:
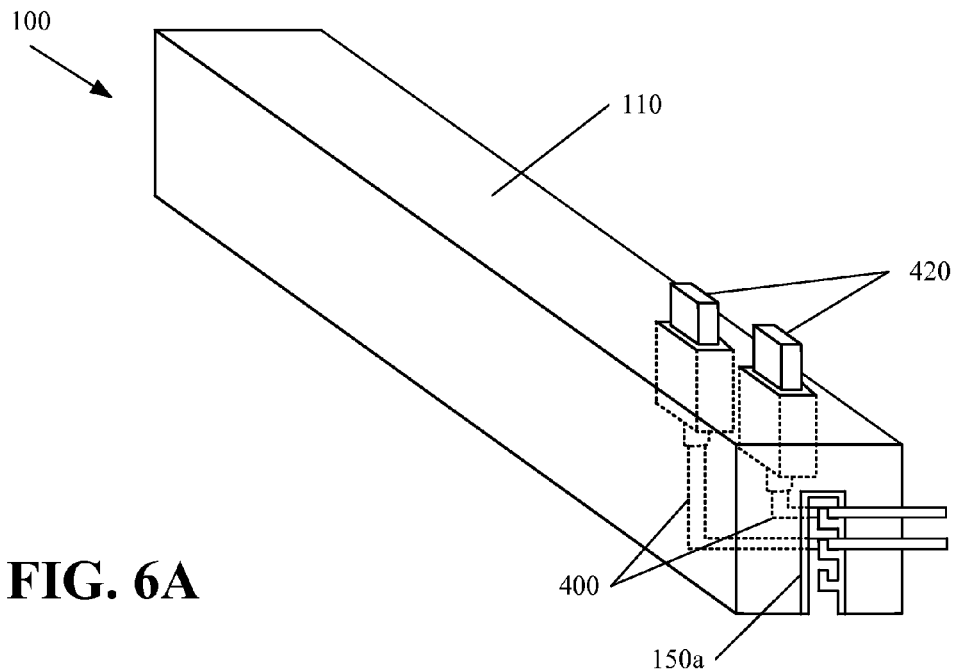
FIG. 6A is a schematic drawing showing a cable retention mechanism according to an exemplary embodiment of the invention.

FIG. 6A is a schematic drawing illustrating cables interfacing with a cable retention mechanism. As shown in FIG. 6A, the cable retention mechanism can include a rear cable holder 150a in the main body 110 and the external connector cables 400 of the external connectors 420.

The main body 110 includes a cable organizer 150a to keep cables 400 organized as they leave the main body 110 and prevent cables 400 from dropping out of the main body 110 when the docking station 100 is picked up. The cable organizer 150a can be formed from opposing textured surfaces forming a slot that is parallel to that of the external connectors 420. The texturing on the textured surface can be fingers as showing in FIG. 6A. The cable organizer 150a can be arranged horizontally or vertically to best accommodate the cables 400 of the external connectors 420 which protrude from the opening in the cable organizer 150a.

The cable organizer 150a can engage the cables 400 as a group or individually. The cable organizer 150a can include one to five or more fingers. Each finger can engage one or more cables 400 to prevent them falling out of the main body 110. The cable organizer 150a can be made out of the same material as the main body 110 or as the lining (not shown). The cable organizer 150a material can preferably be formed from a material soft enough that does not damage the cables 400. In this embodiment, one finger in the cable organizer 150a can engage one or two cables 400 by providing a hook that the cable 400 can hang on.

Figure 6B:
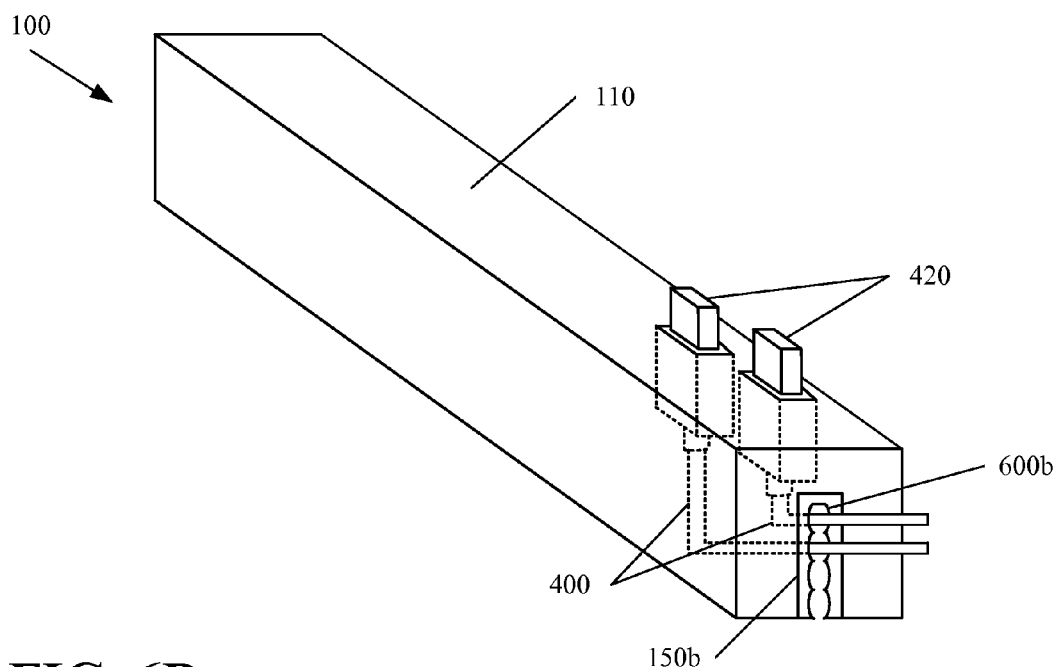
FIG. 6B is a schematic drawing showing a cable retention mechanism according to an exemplary embodiment of the invention.

FIG. 6B is a schematic drawing illustrating cables interfacing with a cable retention mechanism. As shown in FIG. 6B, the cable retention mechanism can include a rear cable holder 150b in the main body 110 and the external connector cables 400 of the external connectors 420.

The main body 110 includes a cable organizer 150b to keep cables 400 organized as they leave the main body 110 and prevent cables 400 from disengaging with the main body 110 when the docking station 100 is picked up. The cable organizer 150b can be formed from opposing ridged surfaces forming a slot that is parallel to that of the external connectors 420. The cable organizer 150b can be arranged horizontally or vertically to best accommodate the cables 400 of the external connectors 420 which protrude from the opening in the cable organizer 150b.

The cable organizer 150b can engage the cables 400 as a group or individually. The cable organizer 150a can include one to five or more ridges. Each ridge can engage one or more cables 400 to prevent them from falling out of the main body 110. The cable organizer 150b can be made out of the same material as the main body 110 or as the lining (not shown). The cable organizer 150b material can preferably be formed from a material soft enough that does not damage the cables 400.

Figure 7A:
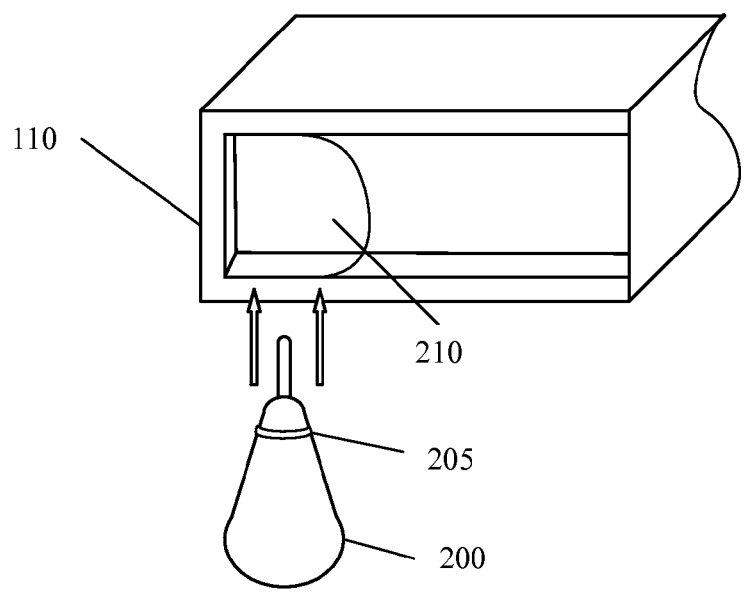
FIG. 7A is a schematic drawing showing a hex key and hex key retention mechanism.

FIG. 7A is a schematic drawing illustrating a hex key and hex key retention mechanism. As shown in FIG. 7A, a hex key retention mechanism in the bottom of the main body 110 includes a tool 200, a retaining ring feature 205, and a slot 210 for storing and retaining the tool 200.

The bottom of the main body 110 can include a slot or recess 210 for storing and retaining tool 200. The slot 210 can be sized to match the relative dimensions of the tool 200. A tool 200 can be used to tighten and loosen the fasteners in fastener holes 130.

The slot 210 for the fastening tool 200 can be placed anywhere on the bottom of the main body 110. The slot 210 can be positioned such that it does not interfere with the voids 120 and the cables to be inserted therein. The tool 200 can be attached to the slot 210 or main body 110. The slot 210 can protect the tool 200 and prevents loss of the tool 200. The tool 200 may be a hex key, screwdriver, allen wrench, or other similar fastening tool.

The retaining feature 205 can be a raised ridge or bump on the surface of the tool 200. The retaining feature 205 can engage a corresponding channel or detent (not shown) inside the slot 210 that holds the tool 200 in place. In the alternative, the retaining feature 205 can be a detent or depression in the tool 200 designed to engage a corresponding ridge or bump in the slot 210. The tool 200 can include a magnet (not shown) and the slot 210 can also contain a magnet (not shown). When the tool 200 is inserted in the slot 210, the tool 200 can be retained therein by magnetic attraction between the magnets in the tool 200 and slot 210, respectively.

Figure 7B:
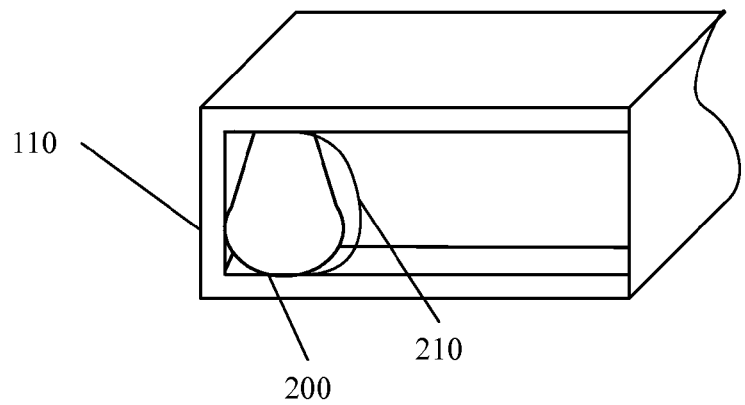
FIG. 7B is a schematic drawing showing a hex key in a hex key retention mechanism.

FIG. 7B is a schematic drawing illustrating a hex key in a hex key holder. As shown in FIG. 7B, a hex key (tool 200) can be retained in slot 210 in the bottom of the main body 110.

Figure 8:
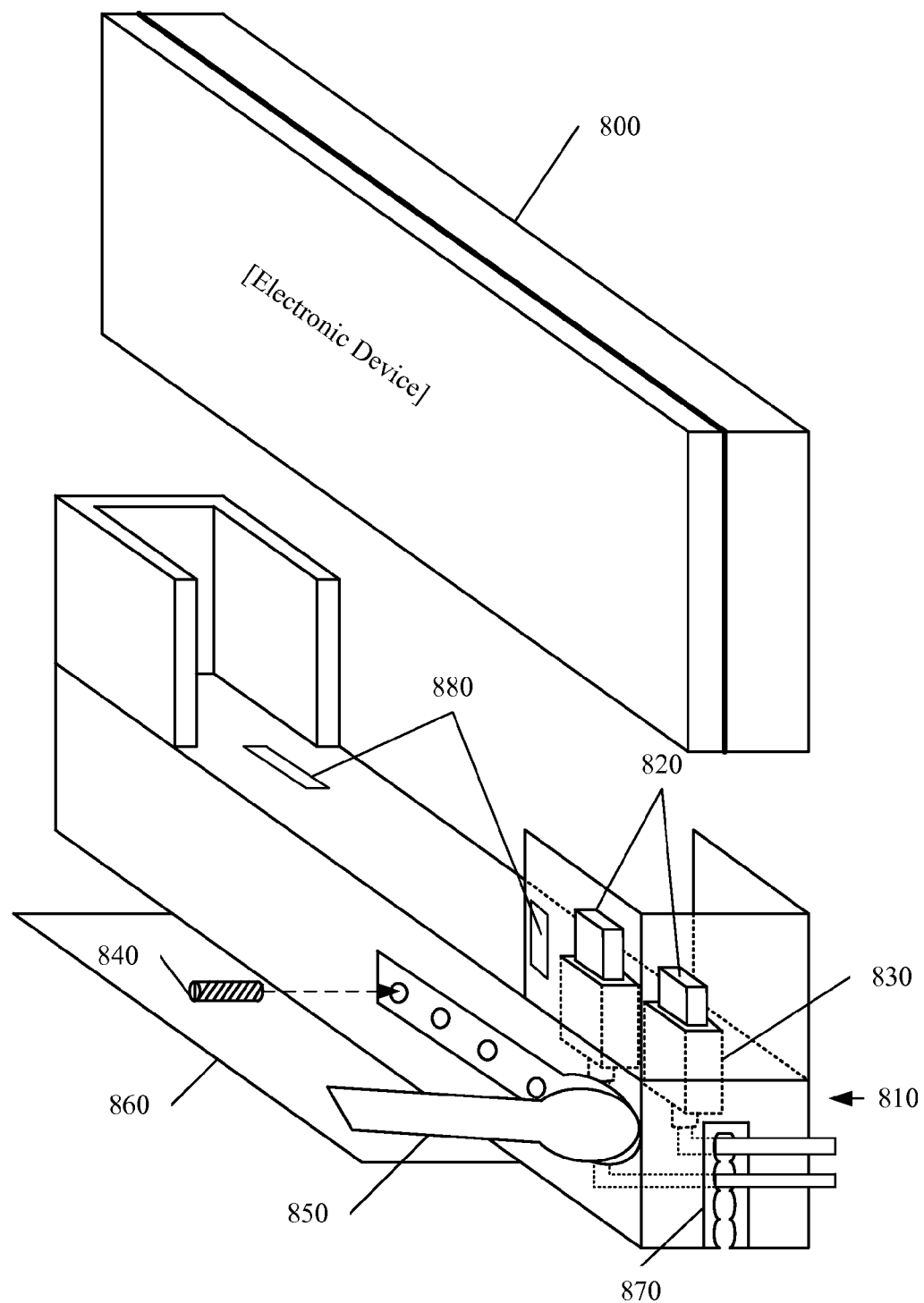
FIG. 8 is a schematic drawing illustrating an electronic device interfacing with an exemplary embodiment of the present invention.

FIG. 8 is a schematic drawing illustrating an electronic device interfacing with an exemplary embodiment of the present invention. As shown in FIG. 8, an electronic device 800 can interface with an with a docking station 810. External connectors 820 can pass through voids 830 in the main body and can be secured using a fastener 840. Voids 830 and fasteners 840 can form integral fasteners and can be protected by an integral fastener cover 850. In a vertical orientation, a stabilizing member 860 can maintains the docking station 810 and electronic device 800 in an upright and vertical orientation. A cable organizer 870 can retain the cables of the external connectors 820 and prevent tangling. Vents 880 in multiple locations can keep the electronic device 800 from overheating while docked.

It will be apparent to those skilled in the art that various modifications and variations can be made in the docking station for portable electronics of embodiments of the invention without departing from the spirit or scope of the invention. Thus, it is intended that embodiments of the invention cover the modifications and variations of this invention provided they come within the scope of the appended claims and their equivalents.

What is claimed is:

1. A docking station for holding a plurality of external connectors in position to interface with an electronic device, the docking station comprising:

a main body having a first side and a second side;
a positioning member extending vertically from the first side of the main body for receiving the electronic device;

a stabilizing member extending horizontally on the second side;
a first through-hole extending from the first side to the second side; and
a fastener for securing an external connector in the through-hole.

2. The docking station of claim 1 further comprising:
a first side wall of the positioning member;
a second side wall of the positioning member;
a third side wall of the positioning member; and
a fourth side wall of the positioning member.

3. The docking station of claim 1 further comprising:
a first ridged surface;
a first ridge on the first ridged surface;
a second ridged surface facing the first ridged surface;
a second ridge on the second ridged surface; and
a gap separating the first ridge and the second ridge.

4. The docking station of claim 3 wherein the gap is between ¼" and ½".

5. The docking station of claim 1 further comprising:
a plate at least partially covering the fastening mechanism.

6. The docking station of claim 1 further comprising:
a retention mechanism for securing the plate.

7. The docking station of claim 1 further comprising:
a tool for actuating the fastening mechanism; and
a slot in the main body for storing the tool.

8. The docking station of claim 1 further comprising:
a shell of the main body formed from a first material;
a tray of the main body formed from a second material; and
wherein the first material is harder than the second material.

9. The docking station of claim 1 further comprising:
a first vent-hole extending from the first side of the main body to the second side of the main body.

10. The docking station of claim 1 further comprising:
a second vent-hole extending from the first side of the main body to the second side of the main body.

11. The docking station of claim 1 further comprising:
a first side wall of the positioning member; and
a first vent-hole formed in the first side wall.

12. A docking station for connecting a plurality of external connectors to an electronic device, the docking station comprising:
a main body;
an interface surface on the main body;
a first plug on the interface surface;
a second plug on the interface surface;
a positioning member extending vertically from the interface surface for receiving the electronic device;
a bottom side of the main body; and
a stabilizing member substantially parallel to the interface surface and forming a base on the bottom side.

13. The docking station of claim 12 further comprising:
a shell of the main body formed from a first material;
a tray of the main body formed from a second material; and
wherein the first material is harder than the second material.

14. The docking station of claim 12 further comprising:
a first vent-hole disposed on the interface surface; and
a second vent-hole disposed on a sidewall of the positioning member.

15. The docking station of claim 12 further comprising:
a first port on the main body electrically connected to the first plug.

16. The docking station of claim 15 further comprising:
a second port on the main body electrically connected to the second plug.

17. A docking station for holding a plurality of external connectors in position to interface with an electronic device, the docking station comprising:
a main body having a top side and a bottom side opposite the top side;
a positioning member extending vertically from the top side of the main body for receiving the electronic device;
a stabilizing member on the bottom side;
a first through-hole extending from the top side to the bottom side;
a fastener for securing an external connector in the through-hole; and
a plate at least partially covering the fastening mechanism.

18. The docking station of claim 17 further comprising:
a first ridged surface;
a first ridge on the first ridged surface;
a second ridged surface facing the first ridged surface;
a second ridge on the second ridged surface; and
a gap separating the first ridge and the second ridge.

19. The docking station of claim 17 further comprising:
a tool for actuating the fastening mechanism; and
a slot in the main body for storing the tool.

20. The docking station of claim 17 further comprising:
a shell of the main body formed from a first material;
a tray of the main body formed from a second material; and
wherein the first material is harder than the second material.

21. The docking station of claim 17 further comprising
a first vent-hole on the interface surface extending from the top side of the main body to the bottom side of the main body;
a side wall of the positioning member; and
a second vent-hole formed in the side wall.

* * * * *